Nov. 15, 1938.  E. H. PIRON  2,136,563

SLACK LIMITING DEVICE

Filed Feb. 27, 1937

EMIL H. PIRON
INVENTOR.

BY
ATTORNEY.

Patented Nov. 15, 1938

2,136,563

UNITED STATES PATENT OFFICE 2,136,563

SLACK LIMITING DEVICE

Emil H. Piron, New York, N. Y., assignor to Transit Research Corporation, New York, N. Y., a corporation of New York Application February 27, 1937, Serial No. 128,119

2 Claims. (Cl. 188—197)

This invention relates to force transmitting devices of the type wherein a force applying means travels through varying distances and has for its object to limit the return of the means to a predetermined amount independent of the said distance of travel.

In the case of hand brakes for trolley cars, as an example of the application of my invention, a shaft is mounted for rotation by a hand wheel. Anchored near the lower end of the shaft is a cable which winds up on the shaft as the shaft is rotated thereby applying brakes. The number of turns of the wheel for brake application varies with the wear of the brake shoes, the size of the wheels, the rate of desired deceleration and other factors. When the brake is released by reverse rotation of the hand wheel the brakes will drag unless completely released while, on the other hand, if the cable is completely unwound from its shaft there may be an undue amount of slack in the cable. It is an object of this invention to provide means whereby the hand wheel and shaft may be rotated in reverse for any number of turns in excess of that required to release the brakes without introducing a slack condition of the cable.

More particularly it is an object of this invention to provide a device for use in conjunction with the drum and cable force transmitting device for preventing slack in the cable when the drum is reversed to relieve force application.

Other objects and advantages will become hereinafter more apparent as reference is had to the accompanying drawing wherein:—

Figure 1:
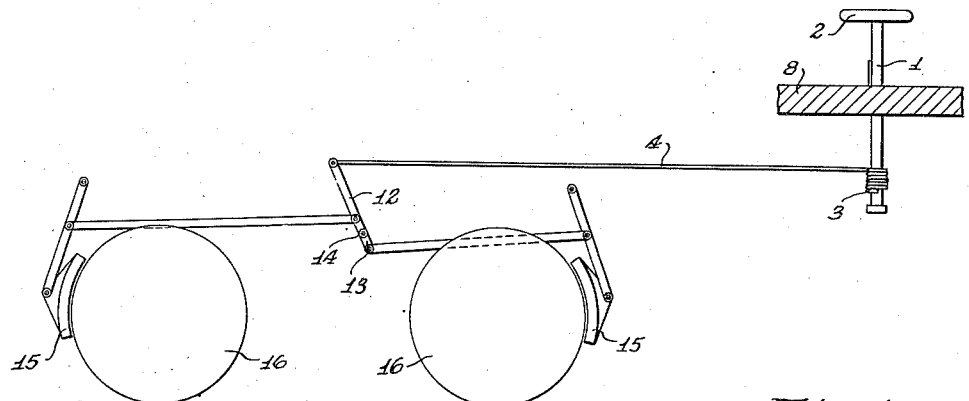
Fig. 1 is a diagrammatic view of a brake equipped with my invention.
Figures 2, 3:
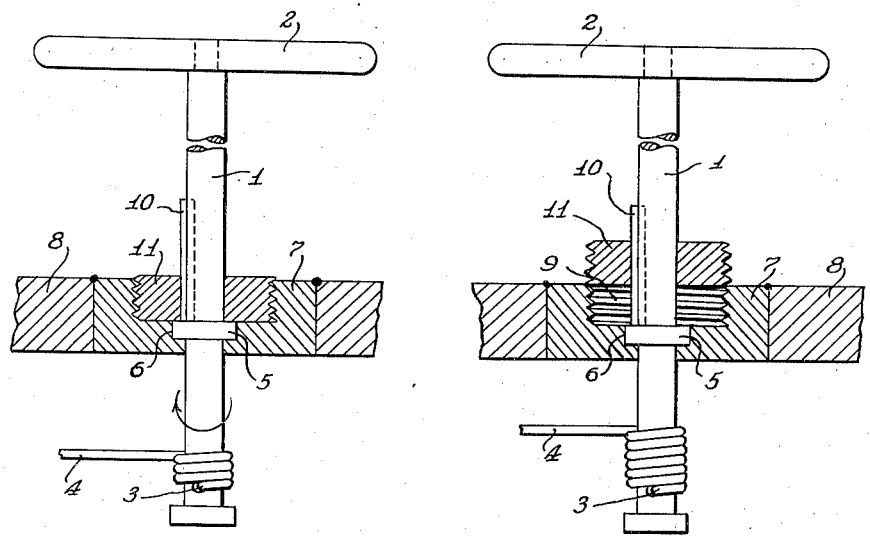
Fig. 2 is a sectional view of a brake shaft equipped with my invention, in one position.
Fig. 3 is a view similar to Fig. 2 with the parts shown in another position.

1 indicates a vertical shaft having a hand wheel 2 fixedly secured to the upper end thereof. Anchored at 3 to the lower part of the shaft 1 is a cable 4. Upon rotation of the wheel 2 the lower end of the shaft constitutes a drum upon which the cable is wound.

The shaft 1 may be supported in any suitable manner as by a collar 5 which serves as a thrust bearing and which seats in an annular recess 6 in a plug 7 integrally secured to any suitable part 8 of a vehicle body. The recess 6 terminates at a larger recess 9 which is threaded.

From the collar 5 a key 10 of substantial length extends along the shaft 1, being integral therewith. Slidably mounted on the shaft 1 and having a keyway for engagement by the key 10 is a nut or collar 11 threaded exteriorly.

In operation, when the cable 4 is wound on its drum by rotation of the shaft 1 in the direction of the arrow there is no engagement of the threads of the collar 11 with the threads of the recess 9. It is evident that regardless of how many turns the shaft 1 makes the collar 11 merely rotates, using the top thread of the recess 9 as a seat and remaining in contact with this top thread by gravity. Thus, the cable 4 may pull an arm 12 to rotate a link 13 about its shaft 14, thereby drawing the brake shoes 15 against wheel treads 16 by a clasp brake linkage. The number of turns of the shaft 1 to apply the brakes will depend upon the thickness of the shoes 15, upon the force applied to the hand wheel etc., and will necessarily vary. When the shaft 1 is reversely rotated to release the brakes the threads of the collar 11 immediately begin engagement with the threads of the recess 9 and the collar will progress into the recess until progress is stopped by engagement with the bottom of the recess. The number of possible turns is predetermined to permit a complete release of the brakes but to prevent undue slack in the cable 4.

What I claim is:—

1. In combination, a rotary force applying means, said means being rotatable in one direction to apply a force and in reverse direction to relieve the application of force, means independent of said force applying means for limiting the rotation in reverse direction comprising a stationary member having a first threaded portion, a member having a second threaded portion carried by and slidably keyed to a rotary part of said force applying means and disengageable with said first threaded portion upon each rotation in one direction, and means for limiting the number of possible turns of said first portion in said second portion upon rotation in reverse direction.

2. A brake applying means comprising a vertical shaft, manual means for rotating said shaft, the lower end portion of said shaft having a cable anchored thereto, and adapted to wind thereon when said drum is rotated in one direction, a portion of the shaft between the cable anchorage and said manual means having an elongated key integral therewith, a guide through which said shaft extends having a threaded portion of substantially larger diameter than said shaft, a collar threaded exteriorly and having a keyway interiorly for slidably receiving said key, said shaft when rotated for cable winding rotating said collar contrary to the direction for engaging the threads with those of said threaded portion and when rotated for cable unwinding causing the threads of said collar to progressively engage those of said threaded portion, and means for limiting the possible number of turns which said collar can make in the direction of cable unwinding.

EMIL H. PIRON.